United States Patent
Rege et al.

(10) Patent No.: US 7,095,569 B2
(45) Date of Patent: Aug. 22, 2006

(54) LENS SYSTEM FOR A MOTOR VEHICLE VISION SYSTEM

(75) Inventors: Siddharth S. Rege, Tucson, AZ (US); Stephen H. Fox, Kokomo, IN (US); Ronald M. Taylor, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/831,828

(22) Filed: Apr. 26, 2004

(65) Prior Publication Data

US 2005/0237630 A1    Oct. 27, 2005

(51) Int. Cl.
G02B 13/04    (2006.01)

(52) U.S. Cl. ...................... 359/749; 359/708

(58) Field of Classification Search ........ 359/749–753, 359/725, 680–682; 701/301, 23, 28; 340/435, 340/901, 903; 348/143, 148, 113, 116, 118–119
See application file for complete search history.

(56) References Cited

U.S. PATENT DOCUMENTS

| | | | |
|---|---|---|---|
| 3,999,840 A | 12/1976 | Momiyama | |
| 5,648,835 A | 7/1997 | Uzawa | |
| 5,798,876 A * | 8/1998 | Nagano | 359/819 |
| 6,052,232 A * | 4/2000 | Iwaki | 359/642 |
| 6,088,172 A | 7/2000 | Sato | |
| 6,115,651 A | 9/2000 | Cruz | 701/1 |
| 6,201,642 B1 | 3/2001 | Bos | |
| 6,853,493 B1 * | 2/2005 | Kreitzer | 359/651 |
| 2001/0013973 A1 * | 8/2001 | Box | 359/565 |
| 2003/0174410 A1 | 9/2003 | Noda | |
| 2004/0257677 A1 * | 12/2004 | Matsusaka | 359/783 |

FOREIGN PATENT DOCUMENTS

| | | |
|---|---|---|
| DE | 10037129 | 4/2001 |
| EP | 1 065 642 | 1/2001 |
| JP | 11112968 | 4/1999 |
| JP | 2003185918 | 7/2003 |
| JP | 2004061910 | 2/2004 |

OTHER PUBLICATIONS

Partial European Search Report, dated Aug. 11, 2005.
European Search Report dated Feb. 01, 2006, Ep 0507 5904.

* cited by examiner

*Primary Examiner*—Jordan M. Schwartz
(74) *Attorney, Agent, or Firm*—Stefan V. Chmielewski

(57) ABSTRACT

A fisheye-corrected lens system includes a plurality of axially aligned lenses. At least one of the lenses includes an aspheric surface and an image distortion of the lens system is less than about five percent at a maximum field angle. A furthest point of the aspheric surface is positioned within a distance less than about fifty percent of a diagonal dimension of an associated imager.

19 Claims, 10 Drawing Sheets

| Lens Surface | Lens Type | Radius of Curvature | Thickness | Material | Semi-Diameter |
|---|---|---|---|---|---|
| 311 | Odd Aspheric | 27.955560 | 1.000000 | COC | 1.970380 |
| 313 | Spheric | 2.867307 | 1.443494 | COC | 1.369889 |
| 315 | Spheric | -146.540009 | 1.362500 | COC | 1.500000 |
| 317 | Spheric | -3.015592 | 0.000000 | COC | 1.500000 |
| 340 | Stop | - | 0.020983 | - | 0.588696 |
| 319 | Spheric | 4.110337 | 1.287012 | COC | 1.500000 |
| 321 | Spheric | -9.932584 | 0.612719 | COC | 1.500000 |
| 323 | Spheric | -3.000000 | 0.500000 | COC | 1.500000 |
| 325 | Spheric | -3.368768 | 2.844504 | COC | 1.400000 |
| 350 | Imager | - | - | - | 2.433129 |

FIG. 3A
Prior Art

| Lens Surface | r1 | r2 | r3 | r4 | r5 | r6 | r7 | r8 |
|---|---|---|---|---|---|---|---|---|
| 311 | 0 | 0.029021996 | 0.010835643 | -0.018207952 | 0 | 0 | 0 | 0 |

FIG. 3B
Prior Art

| Lens Surface | | | | |
|---|---|---|---|---|
| 611 | Odd Aspheric | -67.959303 | 1.000000 | 3.109602 |
| 613 | Spheric | 2.323757 | 4.018562 | COC | 1.946372 |
| 615 | Spheric | -7.555657 | 1.362500 | COC | 1.500000 |
| 617 | Spheric | -4.503239 | 0.061347 | COC | 1.500000 |
| 640 | Stop | - | 0.087211 | - | 1.020502 |
| 619 | Spheric | -1021.088517 | 1.287012 | COC | 1.500000 |
| 621 | Spheric | -6.185784 | 0.216784 | COC | 1.500000 |
| 623 | Spheric | 3.602162 | 1.000000 | COC | 1.750000 |
| 625 | Spheric | 27.031309 | 3.576534 | COC | 1.750000 |
| 627 | Odd Aspheric | -1.952148 | 1.000000 | COC | 1.712942 |
| 629 | Spheric | - | 0.561301 | COC | 2.107713 |
| 650 | Imager | - | - | - | 2.444306 |

FIG. 6A

| Lens Surface | r1 | r2 | r3 | r4 | r5 | r6 | r7 | r8 |
|---|---|---|---|---|---|---|---|---|
| 611 | 0 | 0.00959850 | 0.008204565 | -0.001980929 | 0 | 0 | 0 | 0 |
| 627 | 0 | 0.3728846 | 0.039773112 | -0.044257284 | 0 | 0 | 0 | 0 |

FIG. 6B

| Lens Surface | | | | |
|---|---|---|---|---|
| 911 | Odd Aspheric | 74.964720 | 1.000000 | 2.755002 |
| 913 | Spheric | 1.741268 | 3.068018 | COC | 1.565072 |
| 315 | Spheric | -146.540009 | 1.362500 | COC | 1.500000 |
| 317 | Spheric | -3.015592 | 0.000000 | COC | 1.500000 |
| 340 | Stop | - | 0.020983 | - | 1.033205 |
| 319 | Spheric | 4.110337 | 1.287012 | COC | 1.500000 |
| 321 | Spheric | -9.932584 | 0.612719 | COC | 1.500000 |
| 323 | Spheric | -3.000000 | 0.500000 | COC | 1.500000 |
| 325 | Spheric | -3.368768 | 2.378078 | COC | 1.400000 |
| 927 | Odd Aspheric | -1.958464 | 1.000000 | COC | 1.740579 |
| 929 | Spheric | - | 0.334104 | - | 2.181528 |
| 950 | Imager | - | - | - | 2.447356 |

FIG. 9A

| Lens Surface | r1 | r2 | r3 | r4 | r5 | r6 | r7 | r8 |
|---|---|---|---|---|---|---|---|---|
| 911 | 0 | 0.011535056 | 0.014258332 | -0.003928199 | 0 | 0 | 0 | 0 |
| 927 | 0 | 0.44214479 | 0.072502626 | -0.070580815 | 0 | 0 | 0 | 0 |

FIG. 9B

| Lens | Lens Type | Radius of Curvature | Thickness | Material | Semi-Diameter |
|---|---|---|---|---|---|
| 1, 1st surface | Odd Aspheric | 24.669565 | 1.500000 | COC | 4.500000 |
| 1, 2nd surface | Spheric | 2.095529 | 3.000000 | COC | 2.150000 |
| 2, 1st surface | Spheric | -3.509922 | 2.750000 | COC | 2.150000 |
| 2, 2nd surface | Spheric | -3.919148 | 0.424618 | COC | 3.000000 |
| | Stop | - | 0.568484 | - | 0.780000 |
| 3, 1st surface | Spheric | 10.559672 | 2.250000 | COC | 3.000000 |
| 3, 2nd surface | Spheric | -10.366955 | 0.400000 | COC | 3.000000 |
| 4, 1st surface | Spheric | 3.874129 | 3.000000 | COC | 3.000000 |
| 4, 2nd surface | Spheric | -18.458887 | 1.000000 | COC | 3.000000 |
| 5, 1st surface | Odd Aspheric | -3.885199 | 0.600000 | COC | 1.900000 |
| 5, 2nd surface | Spheric | - | - | | 2.250000 |
| | Imager | - | - | | 2.000000 |

FIG. 12A

| Lens | r1 | r2 | r3 | r4 | r5 | r6 | r7 | r8 |
|---|---|---|---|---|---|---|---|---|
| 1, 1st surface | 0 | 0.006151475 | 0.004419535 | 0.001346524 | 0 | 0 | 0 | 0 |
| 5, 1st surface | 0 | 0.220746 | 0.01655 | -0.034516 | 0 | 0 | 0 | 0 |

FIG. 12B

LENS SYSTEM FOR A MOTOR VEHICLE VISION SYSTEM

TECHNICAL FIELD

The present invention is generally directed to a lens system and, more specifically, a lens system for a motor vehicle vision system.

BACKGROUND OF THE INVENTION

Today, motor vehicle manufacturers are increasingly installing safety devices in vehicles to enable drivers to drive in a safer more efficient manner. For example, some manufacturers have included forward looking systems (FLSs), rear detection systems (RDSs) and side detection systems (SDSs) within certain vehicle models. An adaptive cruise control (ACC) system is one example of an FLS. The ACC system uses a radar sensor mounted at the front of the vehicle to detect objects in a forward path of the vehicle. If the lane ahead is clear, the ACC system maintains a set vehicle speed. However, when a slower vehicle is detected, the ACC system maintains a driver-selected distance using throttle control and limited braking between the vehicles. A typical ACC system uses mechanically scanned radar sensors, which normally improves the ability of the system to detect targets, e.g., vehicles in heavy traffic. A typical commercially available ACC system has a range of 150 meters and azimuth of 15 degrees and updates at a 10 hertz rate. An ACC system generally determines a range of a detected object, as well as the relative speed of the detected object.

SDSs detect objects that are at the side of a vehicle, e.g., in a driver's blind spot. A typical SDS includes a radar sensor that is mounted in each rear quarter panel of the vehicle. Each radar sensor is designed to detect objects in an adjacent lane. In this manner, the SDS can provide a visual indication to the driver to warn of objects in the driver's blind spot.

An example of an RDS is a back-up aid (BUA) or a reverse sensing system. BUAs are typically used as short range parking aids and include visual and audible alarms to warn a driver of an impending collision. A typical BUA system includes a radar sensor that provides a rear detection range of up to 6 meters. Some BUAs also include ultrasonic sensors that provide bumper coverage. A typical BUA is activated when a vehicle is: put into reverse gear and is useful for parking, parallel parking, backing in and out of parking spaces and backing at higher speeds.

Video systems are also increasingly being installed in motor vehicles. For example, one proposed BUA incorporates a camera in conjunction with ultrasonic sensors mounted in a bumper of a motor vehicle. In this system, a video display is positioned within the motor vehicle to allow monitoring of an area at a rear of the motor vehicle by a driver. That is, a rear facing camera is mounted at a back of a motor vehicle such that when the vehicle is placed in a reverse gear, a video display is activated to allow the driver to see obstacles which might not otherwise be visible. Such video systems have typically required a lens system that provides a relatively wide viewing angle in order to adequately cover an area at a rear of a motor vehicle. Unfortunately, wide-angle lens systems that provide low-distortion have tended to be relatively expensive and inexpensive wide-angle lens systems have tended to have a relatively high-distortion at a maximum field angle, e.g., forty percent distortion at a maximum field angle of fifty degrees.

What is needed is a wide-angle lens system that is relatively inexpensive and provides relatively low-distortion at a maximum field angle.

SUMMARY OF THE INVENTION

According to one embodiment of the present invention, a fisheye-corrected lens system includes a plurality of axially aligned lenses. At least one of the lenses includes an aspheric surface and the image distortion of the lens system is less than about five percent at a maximum field angle. According to a different aspect of the present invention, the fisheye-corrected lens system includes a plurality of axially aligned lenses with at least one of the lenses including an aspheric surface and the image distortion of the lens system being less than about one percent for eighty percent of the image.

According to a different embodiment of the present invention, a fisheye-corrected lens system includes a plurality of axially aligned lenses. In this embodiment, at least one of the lenses includes an aspheric surface and the image distortion of the lens system is about five percent at a maximum field angle. Additionally, a furthest point of the aspheric surface is positioned within a distance less than, about fifty percent of a diagonal dimension of an associated imager.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which:

FIGS. 3A–3B are tables which depict relevant lens prescription data for the lens system of FIG. 3;

FIGS. 6A–6B are tables which depict relevant lens prescription data for the lens system of FIG. 6;

FIGS. 9A–9B are tables which depict relevant lens prescription data for the lens system of FIG. 9;

FIGS. 12A–12B are tables which depict relevant lens prescription data for an alternative lens system.

DESCRIPTION OF THE PREFERRED EMBODIMENTS

According to various embodiments of the present invention, a vision system for a motor vehicle includes a camera, a lens system, a processor, a monitor and a memory subsystem. The camera, which may be positioned to view an area at a rear of the motor vehicle, is coupled to the processor and to the monitor. The monitor displays images provided by the camera and may also be coupled to the processor. According to the present invention, the placement of a lens, with an aspheric surface, adjacent an image plane of an imager allows for significant distortion reduction for a lens system. Further, the aspheric surface may be tailored to provide a desired distortion curve for the lens system, without negatively impacting image performance of the lens system.

Figure 1:
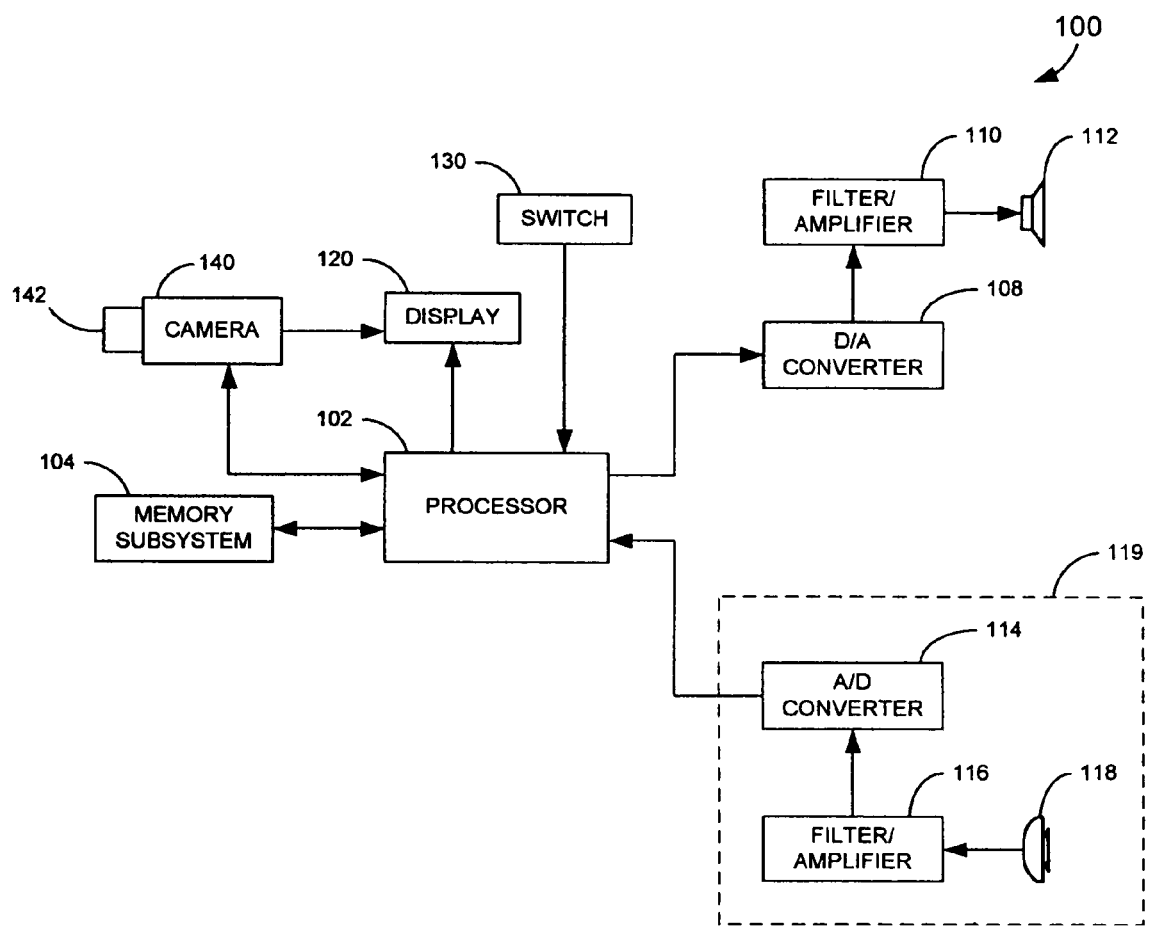
FIG. 1 is an electrical block diagram of an exemplary vision system for a motor vehicle.

FIG. 1 depicts a block diagram of an exemplary vision system 100 that is implemented within a motor vehicle and that may detect when the motor vehicle is placed in a reverse direction, i.e., a reverse gear. As shown, the system 100 includes a processor 102 coupled to a switch 130 (that provides an indication when the motor vehicle is shifted to a reverse gear) and a display/monitor 120. The processor 102 is also coupled to and may control a camera 140 based upon a direction of travel. That is, the processor 102 may instruct the camera 140 to capture images at a rear of the motor vehicle when the motor vehicle is traveling in a reverse direction. As shown, the camera 140 is directly coupled to the display 120. In this manner, the camera 140 can supply images directly to the display 120, thus, reducing the processing burden on the processor 102.

The processor 102 controls audio content provided to a listener, via the speaker 112 and may also supply various information to a user, via the display 120 and/or the speaker 112. As used herein, the term processor may include a general purpose processor, a microcontroller (i.e., an execution unit with memory, etc., integrated within a single integrated circuit), an application specific integrated circuit (ASIC), a programmable logic device (PLD) or a digital signal processor (DSP). The processor 102 is also coupled to a memory subsystem 104, which includes an application appropriate amount of memory (e.g., volatile and non-volatile memory), which provides storage for various routines that may be used to control the camera 140 to provide images for visual display on the display 120. The memory subsystem 104 may also provide a storage area for one or more speech recognition applications.

As is also shown in FIG. 1, an audio input device 118 (e.g., a microphone) is coupled to a filter/amplifier module 116. The filter/amplifier module 116 filters and amplifies the voice input provided by a user through the audio input device 118. This voice input may be utilized to control various automotive accessories positioned in/on the motor vehicle. The filter/amplifier module 116 is also coupled to an analog-to-digital (A/D) converter 114, which digitizes the voice input from the user and supplies the digitized voice to the processor 102, which may execute a speech recognition application, which causes the voice input to be compared to system recognized commands. In general, the audio input device 118, the filter/amplifier module 116 and the A/D converter 114 form a voice input circuit 119.

The processor 102 may execute various routines in determining whether the voice input corresponds to a system recognized command and/or a specific operator. The processor 102 may also cause an appropriate output, e.g., a warning tone or synthesized voice warning, to be provided to the user through an audio output device 112. The synthesized voice output is provided by the processor 102 to a digital-to-analog (D/A) converter 108. The D/A converter 108 is coupled to a filter/amplifier section 110, which amplifies and filters the analog voice output. The amplified and filtered output is then provided to audio output device 112 (e.g., a speaker).

As mentioned above, the processor 102 controls the camera 140 to capture images at a rear of its associated motor vehicle through a lens system 142, constructed according to the present invention. As discussed above, the camera 140 may be activated when the motor vehicle is placed in a reverse gear. The camera 140 may be, for example, a charge-coupled device (CCD) or a complementary metal-oxide semiconductor (CMOS) device. In any case, the camera 140 captures, through the lens system 142, images of objects that are near to the motor vehicle and relatively close to the bumper of the motor vehicle.

In a typical situation, a back-up lamp provided by the motor vehicle provides sufficient illumination for a standard color or black and white CMOS/CCD VGA resolution camera to operate properly at night. Use of an existing back-up lamp avoids the need to add additional lighting to see near objects adequately. In general, at relatively low vehicle speeds, which are involved in parking maneuvers, the camera allows the driver to inspect the scene directly behind the motor vehicle by viewing the display image of the area immediately behind the motor vehicle.

When the reversing function is complete and the vehicle is switched into a non-reverse gear, the display can be muted, if desired, to minimize driver distraction issues. If desired, the video monitor, which provides live video images, may also include integrated speakers for audible warnings and have controls to provide color, brightness and volume adjustment, as well as power and video inputs. A typical liquid crystal diode (LCD) thin film transistor (TFT) monitor of approximately a 5-inch diagonal provides an adequate monitor.

A vision system configured according to the present invention provides information to a driver of a motor vehicle than can advantageously be utilized to facilitate parking. It should be appreciated that additional information may be provided on the display/monitor. It should also be appreciated that the rear facing camera may be implemented in systems that include additional cameras for viewing other areas, for example, front, side and interior, in and around the motor vehicle. These front, side and interior cameras may also utilize a wide-angle lens system constructed according to one of the various embodiments of the present invention.

Figure 2:
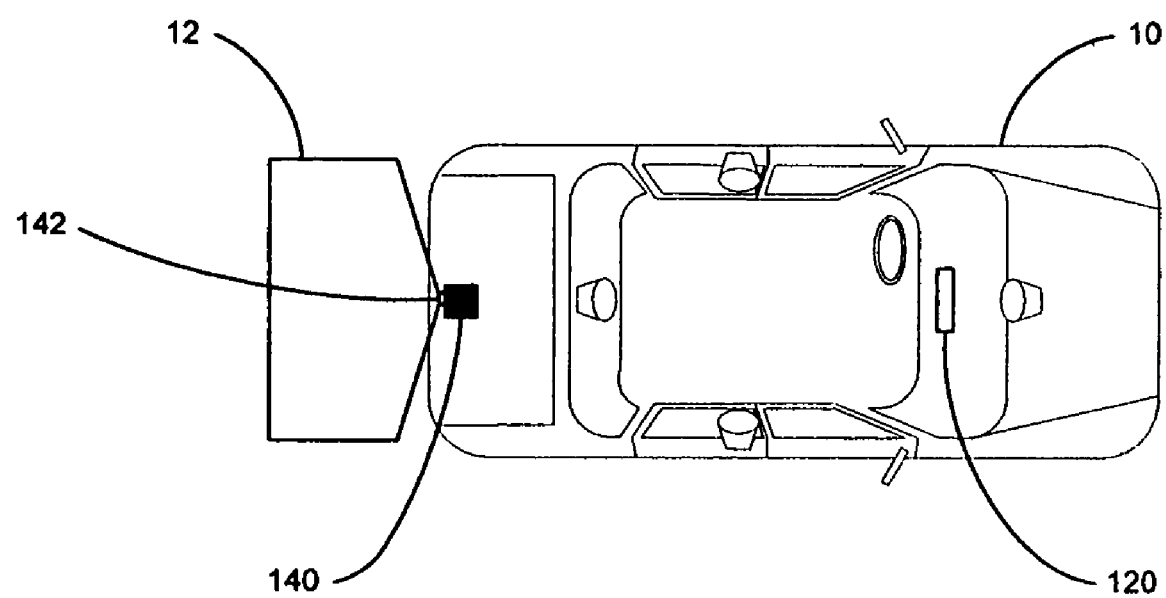
FIG. 2 is a perspective view of an exemplary motor vehicle showing the positioning of various components of the vision system of FIG. 1.

With reference to FIG. 2, a motor vehicle 10 is shown that includes a camera 140 (and an associated lens system 142) that views an area 12 at a rear of the motor vehicle 10. The camera 140 may provide detailed coverage of up to about 5 feet or more from the rear of the motor vehicle 10. As is also shown in FIG. 2, the motor vehicle 10 includes a display 120 mounted within the vehicle 10 and positioned such that a driver of the motor vehicle 10 can view the display 120. It should be appreciated that the display 120 may be a multiple purpose display. For example, the display 120 may function to display images at the rear, or other area, of the motor vehicle 10 and display navigation maps in motor vehicles implementing navigation systems.

Figure 3:
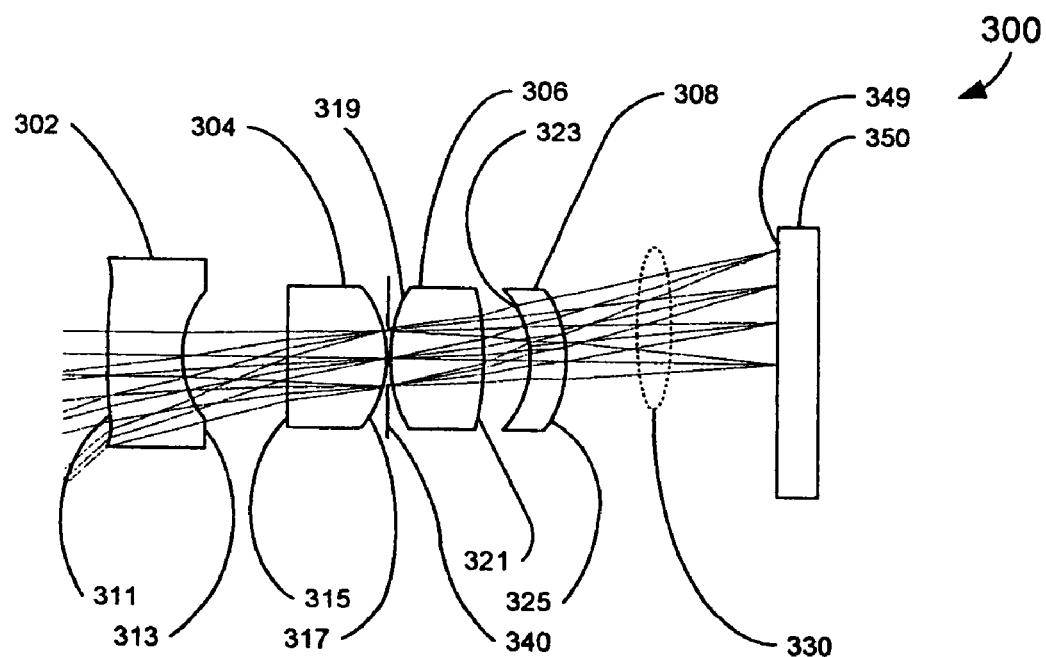
FIG. 3 depicts an exemplary diagrammatic layout of a four element fisheye lens system with relatively high distortion.

With reference to FIG. 3, a four element lens system 300 that exhibits relatively high distortion, e.g., forty percent at a maximum field angle, is depicted. As is shown, a plurality of light rays 330 enter a first surface 311 of a first lens 302 and exit a second surface 313 of the first lens 302, before entering lens 304 through a first surface 315. Upon exiting the second surface 317 of the lens 304, the light rays 330 are transmitted through a hole in an aperture stop 340. After being transmitted through the aperture stop 340, the light rays 330 impinge upon a first surface 319 of a third lens 306 and exit a second surface 321 of the third lens 306. The light rays 330 then impinge upon a first surface 323 of a fourth lens 308 and exit a second surface 325 of the fourth lens 308. The light rays 330 that exit the second surface 325 of the fourth lens 308 impinge upon an image plane 349 of an imager 350, which is associated with a camera. An exemplary lens prescription for the lens system 300 of FIG. 3 is set forth in FIGS. 3A and 3B. It should be appreciated that the lens system 300 only includes one aspheric surface, i.e., the first surface 311 of the lens 302.

Figure 4:
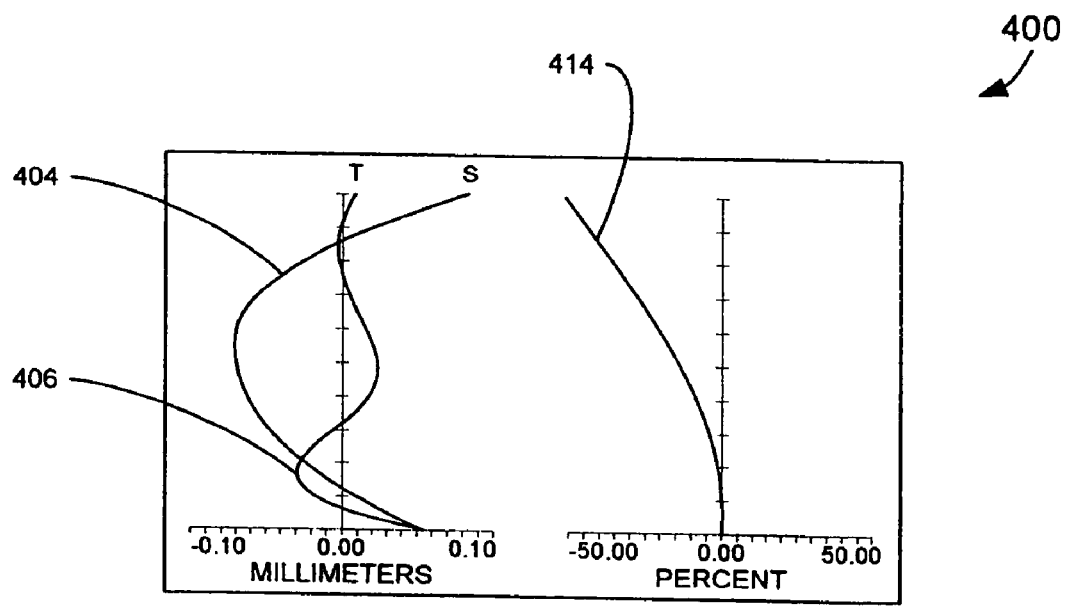
FIG. 4 is a distortion curve for the lens system of FIG. 3.
Figure 5:
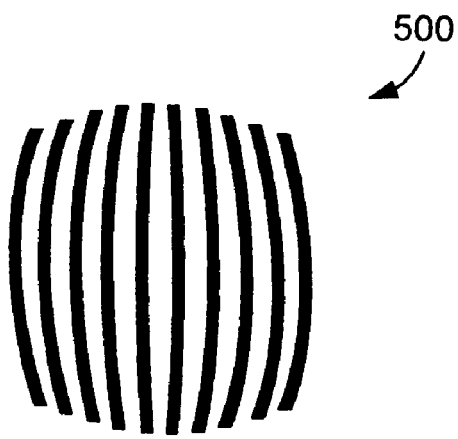
FIG. 5 is a bar chart depicting distortion for the lens system of FIG. 3.

FIG. 4 depicts a graph 400, which includes field curvature curves 404 and 406 and a distortion curve 414 for the lens system 300 of FIG. 3. With reference to FIG. 5, a bar chart 500 further illustrates distortion associated with the lens system 300.

Figure 6:
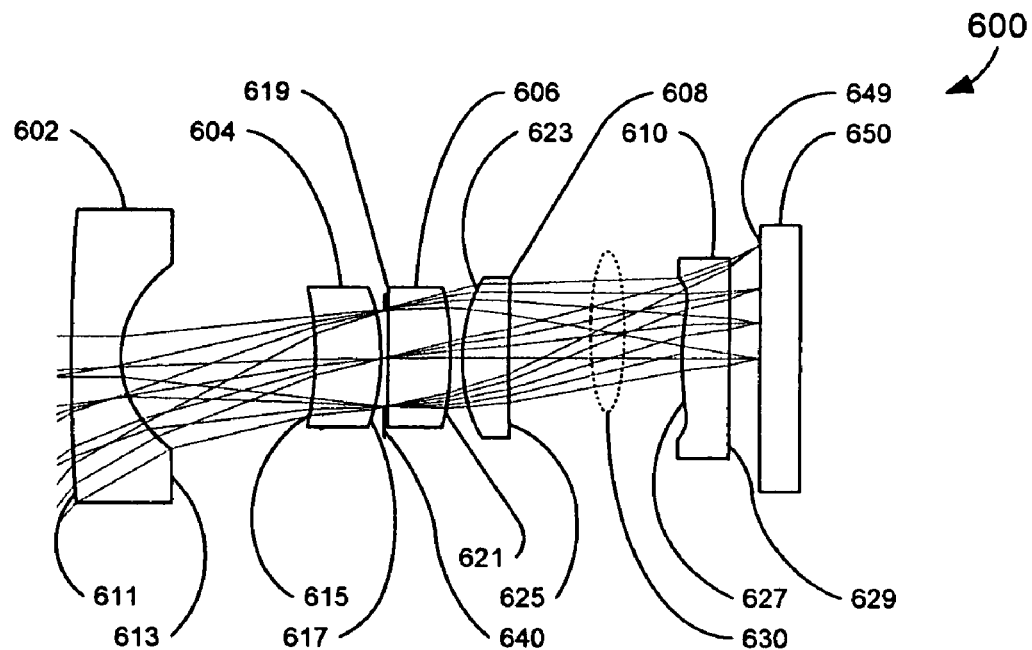
FIG. 6 depicts a diagrammatic layout of a five element lens system, which exhibits a relatively low-distortion as compared to the lens system of FIG. 3.

Referring to FIG. 6, a lens system 600, including five elements 602, 604, 606, 608 and 610, constructed according to one embodiment of the present invention, is depicted. Light rays 630 impinge upon a first surface 611 of the lens 602 and exit a second surface 613 of the lens 602. The light rays 630 exiting the second surface 613 impinge upon a first surface 615 of the lens 604 and exit a second surface 617 of the lens 604. An aperture stop 640 is positioned between the second surface 617 of the lens 604 and a first surface 619 of the lens 606. The light rays 630 passing through a hole in the aperture stop 640 impinge upon the first surface 619 of the lens 606 and exit a second surface 621 of the lens 606.

The light rays 630 exiting the second surface 621 of the lens 606 impinge upon a first surface 623 of the lens 608 and exit a second surface 625 of the lens 608. The light rays 630 exiting the second surface 625 of the lens 608 impinge upon a first surface 627 of the lens 610 and exit a second surface 629 of the lens 610, before impinging upon an image plane 649 of an imager 650, which is associated with a camera. An exemplary lens prescription for the lens system 600 of FIG. 6 is set forth in FIGS. 6A and 6B. It should be appreciated that the lens system 600 only includes two aspheric surfaces, i.e., the first surface 611 of the lens 602 and the first surface 627 of the lens 610. In this embodiment, the proximity of the aspheric first surface 627 of the lens 610 to the image plane 649 of the imager 650 allows for a substantial reduction in distortion, as compared to the lens system 300 of FIG. 3. The lens system 600 exhibits the following characteristics: less than about one percent distortion over about eighty percent of the field of view; about five percent distortion over about a one-hundred degree field of view; and about ten percent distortion over about a one-hundred ten degree field of view.

According to various aspects of the present invention, the first surface 627 of the lens 610 is aspheric and is defined by the following equation:

$$z = \frac{cr^2}{1 + \sqrt{1-(1+k)c^2r^2}} + \beta_1 r^1 + \beta_2 r^2 + \beta_3 r^3 + \beta_4 r^4 + \beta_5 r^5 + \beta_6 r^6 + \beta_7 r^7 + \beta_8 r^8$$

where z is the sag coordinate, c is the curvature (1/radius), r is the radial coordinate (lens unit), k is the conic constant (0 for spheric lenses) and $\beta_1, \beta_2, \ldots$ are the coefficients in surface data detail (from the lens prescription). According to one aspect of the present invention, the furthest point of the aspheric surface is positioned within a distance less than about fifty percent of a diagonal dimension of an associated imager.

Figure 8:
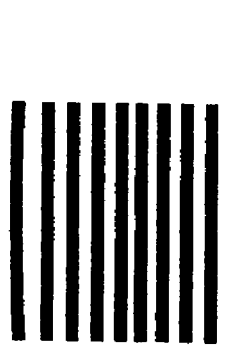
FIG. 8 is a bar chart depicting distortion for the lens system of FIG. 6.
Figure 7:
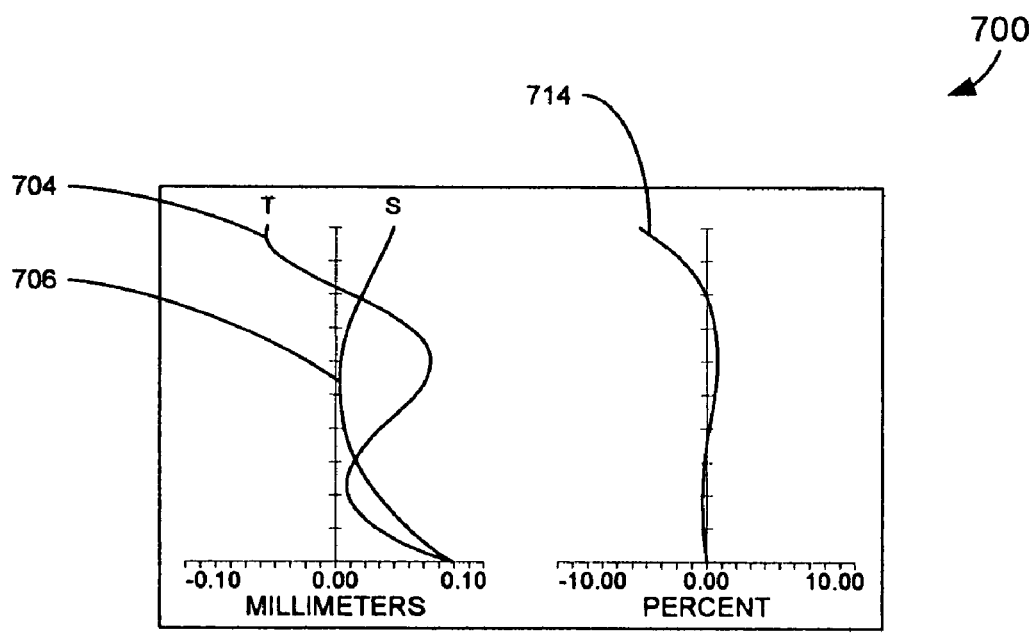
FIG. 7 is a distortion curve for the lens system of FIG. 6.

FIG. 7 depicts a graph 700 that includes field curvature curves 702 and 704 and a distortion curve 714 for the lens system 600 of FIG. 6. It should be noted from the curve 714 that the distortion is greatly reduced for the five element distortion corrected lens system 600 of FIG. 6, as compared to the lens system 300 of FIG. 3. FIG. 8 depicts a bar chart for the lens system 600 of FIG. 6 that readily shows reduced distortion at a maximum field angle of fifty degrees.

Figure 9:
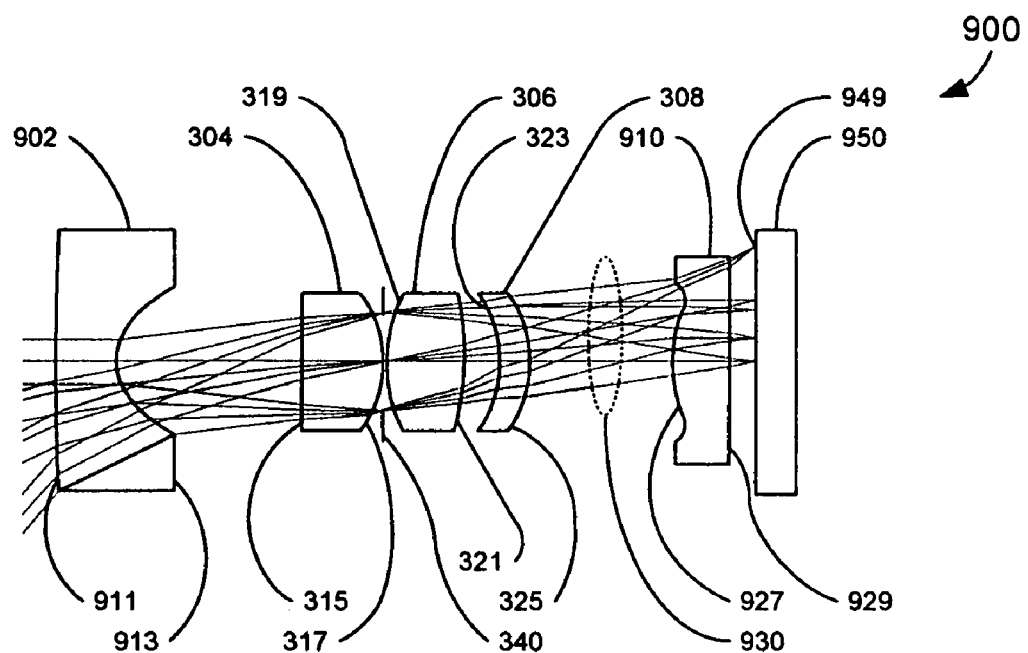
FIG. 9 depicts a diagrammatic layout of a five element lens system that uses the middle three elements of the lens system of FIG. 3.

FIG. 9 depicts a five lens system 900, where the middle three lens elements are identical to the four lens system 300 of FIG. 3. As is shown in FIG. 9, light rays 930 enter a first surface 911 of the lens 902 and exit a second surface 913 of the lens 902. The light rays 930 exiting the second surface 913 of the lens 902 impinge upon a first surface 315 of the lens 304 and exit a second surface 317 of the lens 304. After passing through a hole in the aperture stop 340, the light rays 930 impinge upon the first surface 319 of the lens 306 and exit a second surface 321 of the lens 306. The light rays 930 that exit the second surface 321 of the lens 306 impinge upon a first surface 323 of the lens 308 and exit a second surface 325 of the lens 308, before impinging upon a first surface 927 of the lens 910. The light rays 930 exiting a second surface 929 of the lens 910 impinge upon an image plane 949 of an imager 950 of an associated camera. An exemplary prescription for the lens system 900 of FIG. 9 is shown in FIGS. 9A and 9B. It should be appreciated that the lens system 900 also includes two aspheric surfaces, i.e., the first surface 911 of the lens 902 and the first surface 927 of the lens 910. In this embodiment, the proximity of the aspheric first surface 927 of the lens 910 to the image plane 949 of the imager 950 allows for a substantial reduction in distortion, similar to that of the lens system 600 of FIG. 6.

Figure 11:
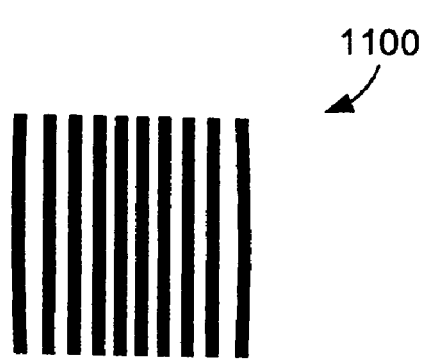
FIG. 11 is a bar chart depicting distortion for the lens system of FIG. 9.
Figure 10:
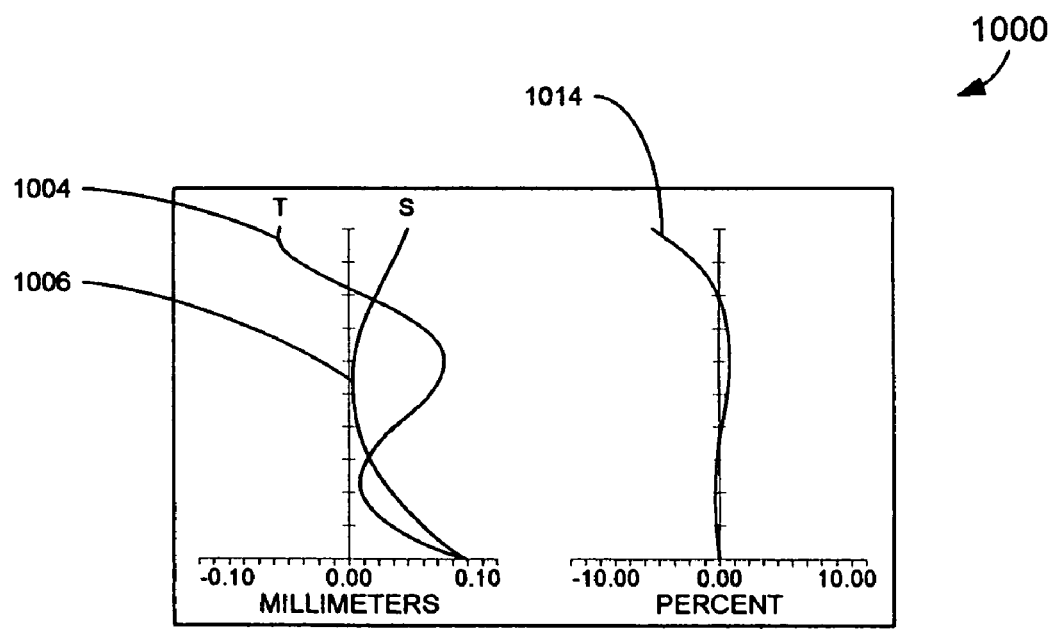
FIG. 10 is a distortion curve for the lens system of FIG. 9.

With reference to FIG. 10, a graph 1000 includes field curvature curves 1004 and 1006 and a distortion curve 1014 for the lens system 900 of FIG. 9. Comparison of the curves 1014 of FIG. 10 and the curve 714 of FIG. 7 illustrates that the distortion for the lens system 600 and 900 are similar. With reference to FIG. 11, a bar chart 1100 further illustrates distortion associated with the lens system 900 of FIG. 9. An alternate prescription for another five element lens system is shown in FIGS. 12A and 12B. In this embodiment, the fifth lens is the lens closest to the image plane of the imager and the aspheric surface is the surface opposite the imager.

Accordingly, a number of fisheye-corrected lens systems have been described herein, which advantageously can be implemented predominantly in plastic, e.g., cyclic olefin copolymer (COC). In certain situations, it may be desirable to implement a lens farthest from the imager in glass or to coat an outer surface of the lens to protect the lens system from environmental considerations, e.g., to protect the lens system from ultraviolet (UV) rays. Plastic lenses provide for relatively inexpensive lens systems that exhibit acceptable distortion at a maximum field angle and are particularly advantageous when implemented within an automotive environment, where low cost and the ability to withstand a wide variation in environmental conditions are highly desirable.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A camera and wide angle lens system, comprising:
    an imager that captures light images for providing electronic data corresponding to the light image;
    a plurality of axially aligned lenses, wherein at least one of the lenses includes an aspheric surface and the absolute value of an image distortion of the lens system is less than about five percent at a maximum field of view of one hundred degrees, and wherein said aspheric surface is located on the object side surface of the lens closest to the imager.

2. The camera and lens system of claim 1, wherein the plurality of axially aligned lenses includes:
    a first lens positioned to receive light at a first surface of the lens;
    a second lens having a first surface positioned adjacent a second surface of the first lens to receive light transmitted through the first lens;
    a third lens having a first surface positioned adjacent a second surface of the second lens to receive light transmitted through the second lens;
    a fourth lens having a first surface positioned adjacent a second surface of the third lens to receive light transmitted through the third lens; and
    a fifth lens having a first surface positioned adjacent a second surface of the fourth lens to receive light transmitted through the fourth lens and a second surface positioned adjacent an imager, wherein the first surface of the fifth lens is an aspheric surface, and wherein the image distortion of the lens system is less than about one percent for about eighty percent of the image.

3. The camera and lens system of claim 2, wherein the first surface of the first lens includes an ultraviolet (UV) coating and the first lens is a plastic lens.

4. The camera and lens system of claim 2, wherein the first lens is a glass lens.

5. The camera and lens system of claim 3, wherein the second, third, fourth and fifth lenses are plastic lenses.

6. The camera and lens system of claim 5, wherein the plastic lenses are cyclic olefin copolymer (COC) lenses.

7. A camera and wide angle lens system, comprising:
    an imager that captures light images for providing electronic data corresponding to the light image;
    a plurality of axially aligned lenses, wherein at least one of the lenses includes an aspheric surface and the absolute value of an image distortion of the lens system is less than about one percent for about eighty percent of the image at a maximum field of view of one hundred degrees.

8. The camera and lens system of claim 7, wherein the plurality of axially aligned lenses, includes:
    a first lens positioned to receive light at a first surface of the lens;
    a second lens having a first surface positioned adjacent a second surface of the first lens to receive light transmitted through the first lens;
    a third lens having a first surface positioned adjacent a second surface of the second lens to receive light transmitted through the second lens;
    a fourth lens having a first surface positioned adjacent a second surface of the third lens to receive light transmitted through the third lens; and
    a fifth lens having a first surface positioned adjacent a second surface of the fourth lens to receive light transmitted through the fourth lens and a second surface positioned adjacent the imager, wherein the absolute value of an image distortion of the lens system is less than about five percent at a maximum field of view of one hundred degrees.

9. The camera and lens system of claim 8 wherein the first surface of the first lens includes an ultraviolet (UV) coating and the first lens is a plastic lens.

10. The camera and lens system of claim 8, wherein the first lens is a glass lens.

11. The camera and lens system of claim 9, wherein the second, third, fourth and fifth lenses are plastic lenses.

12. The camera and lens system of claim 11, wherein the plastic lenses are COC lenses.

13. A camera and wide angle lens system, comprising:
    an imager that captures light images for providing electronic data corresponding to the light image;
    a plurality of axially aligned lenses, wherein at least one of the lenses includes an aspheric surface and the absolute value of an image distortion of the lens system is less than about five percent at a maximum field of view of one hundred degrees, and wherein a furthest point of the aspheric surface is positioned within a distance from the imager less than about fifty percent of the diagonal dimension of the imager.

14. The system of claim 13, wherein the first one of the lenses defines a first surface including an ultraviolet (UV) coating and the first one of the lenses is a plastic lens.

15. The system of claim 13, wherein the first one of the lenses is a glass lens.

16. The system of claim 14, wherein the lens system further comprises second, third, fourth and fifth lenses that are made of a plastic material.

17. The system of claim 16, wherein the plastic lenses are COC lenses.

18. The system of claim 13, wherein the image distortion is less than about one percent for about eighty percent of the image.

19. A visual detection system, comprising:
    a lens system comprising a plurality of axially aligned lenses, wherein at least a first one of the lenses includes an aspheric surface and the absolute value of an image distortion of the lens system is less than about five percent at a maximum field of view of one hundred degrees, wherein said aspheric surface is located on the object side surface of the lens closest to the imager;
    a display;
    a camera coupled to the display;
    a processor coupled to the camera; and
    a memory subsystem coupled to the processor, the memory subsystem storing code that when executed by the processor instructs the processor to perform the step of:
        controlling the camera to provide the image to the display for viewing on the display.

* * * * *